Patented Nov. 28, 1950

2,532,101

UNITED STATES PATENT OFFICE 2,532,101

METHOD FOR SEPARATING ROSIN ACIDS FROM MIXED MATERIALS

Nicholas L. Kalman, deceased, late of Rutherford, N. J., by Anna Kalman, executrix, Essex County, N. J., assignor, by mesne assignments, to Pierce Laboratory, Inc., New York, N. Y., a corporation of New York No Drawing. Application December 1, 1947, Serial No. 789,137

26 Claims. (Cl. 260—97.6)

This invention relates to a method for separating rosin acids from mixed materials such as tall oil and commercial rosin.

As is known, tall oil (a by-product of paper manufacture) constitutes a sludgy mass of dark color and foul odor, the tall oil usually consisting of about 40% rosin acids, about 40% fatty acids, and about 20% of other ingredients and impurities, including rosin hydrocarbons and oxy acids, sterols, color and odor bodies, dirt, etc. The specific composition depends upon the particular paper manufacturing process from which the by-product is derived, the nature of the wood pulp employed, etc. The rosin and fatty acid constituents are commercially valuable materials, and numerous attempts have been made to recover these materials from tall oil.

It is also known that commercial rosins, such as gum rosins and wood rosins contain appreciable quantities of contaminants or impurities, notably rosin hydrocarbons and color bodies.

The present invention has as its primary object the separation in substantially pure form of valuable constituents from mixed materials of the types mentioned above, the invention being especially concerned with the isolation of substantially pure rosin acids.

Briefly described, the foregoing primary objective of the invention is achieved by treating the mixed material in liquid phase, for instance in a solvent, with cyclohexylamine. This forms the cyclohexylamine salt of rosin acids present in the mixed material. The salt being quite solid at room temperature constitutes a readily separable precipitate, separation being effected in any desired manner, as by settlement or filtration.

The foregoing constitutes a highly effective method of separation resulting in a substantially quantitative yield of the cyclohexylamine salt of the rosin acids, which salt may, if desired, be hydrolyzed to yield the substantially pure acids. The method is an exceptionally simple one to employ, especially since it may be carried out without any appreciable elevation of temperature.

In a typical treatment applied either to a commercial rosin or to tall oil, the rosin or tall oil is preferably initially placed in solution in a solvent such as naphtha, a solution containing 20% of the rosin or tall oil being appropriate. The cyclohexylamine is then added to the solution at room temperature and the rosin-cyclohexylamine salt precipitate quickly forms and will settle on standing.

Although the isolation of rosin acids from either commercial rosin or from tall oil is effected in basically the same way, certain minor differences in technique of handling are preferred when treating rosin and certain other techniques are preferred when treating tall oil. Therefore, in the following more detailed description of the method of the invention, the application of the method to the two different types of starting materials is separately discussed.

With respect to the method as applied to the separation of rosin acids from commercial rosins, it is first mentioned that the method is applicable to any of the ordinary rosin products of commerce, such as the various grades of wood rosin and the various grades of gum rosins or even directly to pine oleoresin. The invention is also applicable and, in fact, is of especial advantage when applied to various of the specially treated rosin products, such as disproportionated rosins. As an example of a disproportionated rosin reference is made to the product of prior Patent No. 2,395,278, issued February 19, 1946. In the case of such specially treated rosin products, a high temperature is frequently employed in the special treatment, and such high temperature tends to effect more or less decarboxylation, with resultant increase in content of rosin hydrocarbons present. For many purposes, the presence of rosin hydrocarbons is disadvantageous, for example, because such presence lowers the melting point of the product appreciably below that of the rosin acids present.

The method of the present invention is highly effective for separating the rosin acids from any of the rosins mentioned above, the method yielding a product which, for practical purposes, is entirely free of rosin hydrocarbons and other impurities. When the method is applied to a disproportionated rosin, for instance a rosin treated according to my prior patent above mentioned, the substantially pure rosin acids derived have a very much higher melting point than the disproportionated material.

In treating any of the rosins above referred to, it is preferred to initially place the rosin in solution in an organic solvent. A wide variety of solvents may be employed for this purpose, since the rosin-cyclohexylamine salt is substantially insoluble in many different solvents and may therefore readily be precipitated and separated from the solution. Appropriate solvents include aliphatic hydrocarbons such as naphtha, mineral spirits and petroleum ether; ketones such as acetone; and low molecular weight monohydric alcohols such as ethyl alcohol. In the case of treatment of pine oleoresin the turpentine present may serve as a portion of the solvent to be employed.

The concentration of the rosin in the solution initially prepared may also vary over quite a broad range, for instance anywhere up to 40%. Ordinarily from 15% to 30% will be found to provide a solution of sufficiently low viscosity to enable ready separation of the rosin-cyclohexylamine precipitate. Where the reaction is carried out at elevated temperatures somewhat higher concentrations may be used.

The temperature of reaction of the cyclohexylamine with the solution being treated may vary over a fairly broad range although room temperature is ordinarily satisfactory. The reaction is exothermic so that addition of the cyclohexylamine to a solution of the rosin at room temperature will result in more or less elevation of the temperature depending upon the rate of addition of the cyclohexylamine. The reaction will take place at any reasonably elevated temperature, for instance, up to the boiling point of the solvent used. Thus, with most solvents of the types mentioned above, the temperature may be increased to about 70° or 80° C. On the other hand, the reaction will also take place at temperatures below room temperature, for instance, down to 0° C. or even lower, and cooling the materials during the reaction will serve to avoid excessively rapid reaction. Since the temperature is not critical it is not necessary either to heat or cool the materials during the reaction.

The quantity of cyclohexylamine employed should, of course, be at least as great as that required to neutralize all of the rosin acids present, i. e., a mole-to-mole ratio, and desirably some excess is used in order to ensure reaction with all of the available rosin acids.

After the rosin-cyclohexylide precipitate is secured and separated it is preferably washed one or more times with additional solvent so as to free it from traces of impurities, and the precipitate is then hydrolyzed so as to recover the rosin acids on the one hand and the cyclohexylamine on the other. Hydrolysis may be performed according to any of the well known methods, for instance by the use of hydrochloric acid or sulfuric acid. In a typical case when employing hydrochloric acid, the acid is used in aqueous solution and the hydrolyzed rosin acids readily separate out or may be filtered, the acids thereafter being water washed to yield the pure rosin acid product. The cyclohexylamine may be recovered by known technique from the hydrochloric acid solution and may then be re-used.

The naphtha or other solvent initially employed in preparing the solution of rosin to be treated retains the unsaponifiable constituents in solution, notably the rosin hydrocarbons, so that after separation of the rosin-cyclohexylide therefrom, this solution may be further treated so as to separate and recover the naphtha and the unsaponifiable constituents. According to one technique for this purpose, the solvent (with the unsaponifiables in solution therein) may be washed with dilute aqueous sodium hydroxide to ensure elimination of any acidic constituent present, after which the naphtha is distilled off. When this technique is applied to an initial material consisting essentially of a major component of rosin acids and a minor component of rosin hydrocarbons, the separation of the unsaponifiable fraction from the naphtha or other solvent employed will yield relatively pure rosin hydrocarbons.

Turning now to the method of this invention as applied to the separation of rosin acids from tall oil, it is first noted that one of the primary differences between this starting material (tall oil) as compared with a commercial rosin, is that the tall oil contains fatty acids as a substantial component. However, the method of the invention is effective to separate out the rosin acid component from tall oil, notwithstanding the presence of the fatty acid component, as will now be shown.

Initially the tall oil is placed in solution in a solvent which may be any of those referred to above as useful when treating rosin. The concentration of the solution may also be similar to that employed when treating rosin, although it may be mentioned that the fatty acid constituents of tall oil constitute a liquid component, so that somewhat higher concentrations of the tall oil in the solution may be utilized without resulting in such excessive increase in viscosity as to hamper the separation of the rosin-cyclohexylamine precipitate.

As with the treatment of rosin, the cyclohexylamine is added to the solution of the tall oil at room temperature, although, if desired, the temperature may be varied somewhat, for instance, as discussed above in connection with the treatment as applied to rosins.

While it is not an essential, it is ordinarily desirable to filter the tall oil solution before the treatment with cyclohexylamine, for the reason that tall oil commonly contains substantial quantities of solid contaminants such as dirt, sand and oxy acids.

In the case of tall oil, the quantity of cyclohexylamine added to the solution is preferably sufficient to react not only with all of the rosin acids present but also with all of the fatty acids present. Some slight excess beyond this quantity is desirable to ensure complete reaction.

After the cyclohexylamine treatment the rosin-cyclohexylide precipitates and may be separated, it being noted that the fatty acids present are such that the cyclohexylamine salts thereof are either liquid or have sufficient solubility in the naphtha or other solvent employed to remain in solution. Thus they do not contaminate the rosin-cyclohexylide precipitate.

After separation thereof the rosin-cyclohexylide precipitate is desirably washed and filtered, as with the precipitate secured from the rosin treatment. Thereafter hydrolysis may be employed to recover the pure rosin acids and the cyclohexylamine.

The solution or filtrate remaining after separation of the rosin constituents contains the fatty acid cyclohexylamine salts, as well as the unsaponifiable constituents of the tall oil. This filtrate or solution may then be treated to separate its various constituents, a preferred method for such treatment being to hydrolyze the filtrate, for instance with aqueous hydrochloric acid. Such hydrolysis will result in separation of the filtrate into two layers, one an aqueous layer containing the cyclohexylamine and the other the naphtha or other solvent layer containing the unsaponifiables and the fatty acid. The naphtha layer is then treated with a saponifying agent. Sodium hydroxide is effective for this purpose, and the resulting fatty acid soap may readily be separated from the naphtha solution, the soap being washed and then hydrolyzed so as to yield the substantially pure fatty acids.

The naphtha solution after separation of the fatty acids may be flashed off to yield the unsaponifiables such as sterols and rosin hydrocarbons.

Thus in the treatment of tall oil, the invention not only provides for the isolation of substantially pure rosin acids therefrom but also of substantially pure fatty acids, these constituents being commercially valuable materials, as is known.

It is also contemplated that the mother liquor, i. e., the solution after precipitation and separation of the rosin cyclohexylide, may merely be freed from solvent and used as such, without hydrolysis of the cyclohexylamine salt of the fatty acids, and without other separation steps. Such a material may be employed, for example, as an anti-corrosion agent or may even be directly used in paints and other compositions.

The present application is a continuation-in-part of application 715,641, filed December 12, 1946, now abandoned.

EXAMPLES

The examples given herebelow are divided into two general groups, as follows:

Group A.—Examples of treatment of various rosins.

Group B.—Examples of treatment of tall oil.

GROUP A—ROSINS

In this group examples are given of treatment of ordinary commercial rosin as well as various disproportionated rosins and of crude gum oleoresin. There are first given a group of examples of treatments as applied to disproportionated rosins:

*Example 1*

In this example a disproportionated rosin prepared in accordance with Patent No. 2,395,278, issued February 19, 1946, was used as a starting material, this material having an acid number of 148. The disproportionated rosin was made by subjecting WW wood rosin to heat treatment at 225° C. for five hours, while bubbling $SO_2$ gas therethrough at the rate of 2% per hour based on the weight of the rosin. The disproportionated material had an acid number of 148 and an iodine number of 62.7.

100 g. of this disproportionated rosin were dissolved in 400 g. of naphtha, and while stirring the solution at room temperature 27.2 g. of cyclohexylamine was added, this quantity representing a 1:1 molar ratio of cyclohexylamine to the quantity of rosin acids present in the disproportionated material. A precipitate quickly formed and after standing overnight the precipitate was filtered off and washed several times with naphtha. The precipitate was then dried, yielding 101.8 g. of rosin cyclohexylide.

The rosin acids present in the cyclohexylide represented 79.8% of the total $SO_2$ rosin material taken for treatment. This represents 99.8% of the rosin acids present in the starting material. Thus, it will be seen that the yield is quantitative, for practical purposes.

The rosin cyclohexylide was then hydrolyzed by admixture thereof with 400 cc. of a low boiling aliphatic hydrocarbon solvent, 200 cc. of water and 100 cc. of concentrated HCl. This mixture was stirred until two clear layers formed and was then allowed to stand. The solvent and aqueous layers were separated and the solvent layer washed with water until all mineral acidity was eliminated. The solvent was then removed under vacuum, leaving 71.9 g. of a solid resin having an acid number of 177.3 and an iodine number of 51.5.

*Example 2*

This treatment was also performed on disproportionated rosin. The treatment applied was the same as that described above for Example 1, both with respect to the initial $SO_2$ disproportionating treatment, as well as with respect to formation of the rosin cyclohexylide, hydrolysis, etc. The starting material in this case, however, was gum rosin instead of wood rosin as in Example 1 and had an acid number of 150 and an iodine value of 94.

In this example the yield of the rosin acids in the rosin cyclohexylide was 75.5% on the basis of the total material taken for treatment, and was 93.2% on the basis of the rosin acids present. The acid number of the rosin acids recovered by the hydrolysis was 170.3 and the iodine number 84.6.

*Example 3*

A treatment similar to that above described was applied to gum rosin which had previously been subjected to disproportionation by the employment of sulfur. In the disproportionation treatment of this example WW gum rosin was heated for two and one-half hours at a temperature of 200° C. in the presence of 10% of sulfur. The disproportionated material had an acid number of 152 and an iodine number of 74.6.

200 g. of the disproportionated material was mixed with a low boiling aliphatic hydrocarbon solvent and with 53.6 g. of cyclohexylamine, i. e., the quantity required to react with all of the rosin acids present in the disproportionated material. The rosin cyclohexylide precipitate formed and was filtered off, and the rosin acids in the cyclohexylide comprised 87.5% of the rosin acids present in the total material taken for treatment. The rosin acids were recovered from the cyclohexylide by hydrolysis with 10% aqueous HCl solution and subsequent evaporation of the solvent, these rosin acids having an acid number of 167.2 and an iodine number of 35.2.

*Example 4*

In this example substantially pure rosin acids were separated from commercial WW wood rosin having an acid number of 165 and an iodine value of 134. 200 g. of the wood rosin was placed in solution in 800 cc. of naphtha and 61.0 g. of cyclohexylamine added, the quantity being that theoretically required to react with all of the rosin acids present. The cyclohexylide was filtered off, yielding 218 g. of the salt. The cyclohexylide secured contained a quantity of rosin acids equal to 87.2% of the total material taken for treatment, which was 98% of the rosin acids present in the starting material.

The rosin cyclohexylide was hydrolyzed in the general manner described above, with 33% aqueous HCl solution and crystallized from alcohol, yielding a rosin product having an acid number of 184.5 and an iodine number of 108.8.

*Example 5*

In this example the cyclohexylamine treatment was applied to WW gum oleoresin. For the purpose of the treatment 3993 ml. of turpentine was added to a batch of 1331 g. of the oleoresin and then the theoretical quantity (362 g.) of cyclohexylamine was stirred in, i. e., that quantity required to react with all of the rosin acids present assuming that the initial oleoresin consisted of 80% solids. This treatment was effected at room temperature as in the other examples above and quickly yielded a rosin cyclohexylide precipitate which was washed with petroleum ether and which was thereafter hydrolyzed by mixing the material with petroleum ether and 50% aqueous HCl solution. Upon stratification the solvent and water layers were separated and the solvent was evaporated from the rosin acids therein, yielding a rosin product having an acid number of 177.5 and an iodine number of 122.3. This rosin acid product represented 45.7% of the initial oleoresin taken for treatment.

Example 6

This example was conducted in the same general manner as described above for Example 5 except that 3510 ml. of petroleum ether was added to a batch of 1170 g. of the oleoresin before treatment with the cyclohexylamine. The quantity of cyclohexylamine added was 306 g. The final rosin acid product had an acid number of 180.3 and an iodine number of 147.3 and constituted 55.7% of the initial oleoresin taken for treatment.

GROUP B—TALL OIL

Example 7

In this example the cyclohexylamine separation of this invention was applied to a refined tall oil. Thus, 200 g. of the tall oil was dissolved in 400 g. of a low boiling aliphatic hydrocarbon solvent and 50 g. of cyclohexylamine were added, i. e., a quantity sufficient to react with all of the acidic constituents present (both the rosin acids and the fatty acids). The treatment was effected at room temperature and the rosin cyclohexylide precipitate quickly formed and was filtered off. The precipitate was washed with 10% cyclohexylamine solution in an additional quantity of the same solvent and finally with still further batches of the solvent itself until the filtrate was clear, all of the filtrates being combined with the mother liquor. The rosin cyclohexylide secured in this way contained rosin acids equal to 44.2% of the total tall oil material initially taken for treatment, which corresponds to the quantity of rosin acids commonly present in tall oil.

The cyclohexylide was hydrolyzed with 33% aqueous HCl solution according to the technique described above, yielding a rosin acid product having an acid number of 185.3 and an iodine number of 120.8.

The mother liquor along with the filtrates combined therewith was then treated for recovery of other constituents. Thus, this solution was neutralized with 10% aqueous HCl solution, to bring the pH to 6.5. After stratifying, the acid-water layer was drawn off and the solvent layer washed with water until free of mineral acidity (pH 7). The solution was then dried over $Na_2SO_4$ and subjected to distillation at 100° C., with sufficient vacuum to draw off the solvent rapidly (60–80 mm. Hg.). The distillation residue consisted of an amber viscous oil containing the fatty acid and hydrocarbons, the quantity thereof being 46.4% of the total tall oil initially taken for treatment. The fatty acid and hydrocarbon constituents of this material are capable of separation in known ways.

Example 8

This example illustrates the applicability of the technique of the present invention to separate rosin acids from mixed materials even where only a very small percentage of rosin acids are initially present.

Crude tall oil was first heated for several hours at a temperature of 300° C. in the presence of 1% of phosphoric acid, resulting in extensive decarboxylation of rosin acids present. This decarboxylated material was then distilled, yielding a distillate having an acid number of 118.6.

250 g. of the distillate was dissolved in an equal weight of a low boiling aliphatic hydrocarbon solvent and 66 g. of cyclohexylamine was stirred in at room temperature, this quantity being sufficient to react with all of the acidic constituents present. The temperature rose considerably above room temperature as a result of the reaction. The treatment resulted in formation of a small amount of precipitate which was filtered off and washed with 1% solution of cyclohexylamine in the same solvent. The precipitate was further washed with additional quantities of the same solvent alone until the filtrate was clear. The total quantity of cyclohexylide was 44.1 g.

The rosin cyclohexylide was then hydrolized from ethyl alcohol, by the use of concentrated HCl. The insoluble cyclohexylide split and the rosin acids quickly dissolved in the ethyl alcohol. The acids in pure form were then precipitated by addition of water to the alcohol and the acids were found to be white and crystalline, and to have an acid number of 187.5 and a melting point of 158–162° C.

The mother liquor or solution, with the filtrates combined therewith, was now acidified with 10% aqueous HCl solution and after stratification, the solvent and water layers were separated. The solvent layer was then washed with water until free of mineral acidity and the solvent was then evaporated under vacuum leaving an amber viscous oil constituting approximately 89% of the total tall oil distillate taken for treatment.

Viscous oil residue was then treated with excess methyl alcohol in the presence of $H_2SO_4$ to esterify the fatty acid component. This mixture was refluxed at 75° C. and on cooling two layers formed. The lower layer (alcohol insoluble) contained most of the hydrocarbons and the methyl ester. The upper alcohol layer contained unesterified acids and hydrocarbon. The layers were separated and the alcohol insoluble material was washed with dilute alkali to eliminate traces of free fatty acid and then the liquid was dried over $Na_2SO_4$. This material may readily be further treated to separate the hydrocarbon and fatty acid ester constituents, according to known techniques. The alcohol solution may be used for subsequent esterification batches.

Example 9

Crude tall oil was dissolved in naphtha and treated with cyclohexylamine at room temperature, the cyclohexylamine again being sufficient to react with all acidic constituents of the tall oil. The rosin acids in the rosin cyclohexylide precipitate secured in this way constituted 44.5% of the total tall oil taken for treatment, which corresponds to the quantity of rosin acids normally present in tall oil. Upon hydrolysis and recovery of the rosin acids they were found to have an acid number of 182.2.

Example 10

This example was performed in a manner similar to Example 9 just above. The treatment was applied to a refined tall oil, but the quantity of cyclohexylamine here used was sufficient to react only with the rosin acids present. This also quickly secured the rosin cyclohexylide precipitate. The rosin acids present in the cyclohexylide constituted 43.5% of the tall oil taken for treatment, which corresponds approximately to the quantity of rosin acids normally present in tall oil. The cyclohexylide was hydrolyzed, yielding a rosin acid product having an acid number of 185.3.

Example 11

300 g. of tall oil were dissolved in 1500 cc. of naphtha and 100 g. of cyclohexylamine were added at room temperature, with stirring. Again the rosin cyclohexylide formed and precipitated and after standing overnight the precipitate was filtered off. The rosin acids present in the cyclohexylide represented 39% of the total tall oil taken for treatment.

In addition to the foregoing separation of the rosin acids, this example further illustrates a somewhat different technique for separating the constituents remaining in the mother liquor after separation of the rosin acids.

Thus, the mother liquor was treated with $SO_2$ gas, the gas being bubbled therethrough for several hours. This resulted in splitting of the fatty acid cyclohexylamine salt, the cyclohexylamine being separated as cyclohexylamine sulfite which precipitated from the solution and was filtered off.

After washing to eliminate any trace of $SO_2$, the naphtha was now evaporated from the mother liquor under vacuum at 100° C., yielding an amber oil corresponding approximately to 59% of the total raw material taken for treatment. This residue was redissolved in an equal volume of naphtha and treated with a 2% aqueous $H_2SO_4$ solution at a temperature of 0–5° C. The $H_2SO_4$ solution was added dropwise, with stirring. A small amount of black gum precipitated out. After settling the naphtha solution was poured off and washed with water until neutral. The solvent was then evaporated off and the residue was then distilled under vacuum. The forerun was taken up to a temperature of 184° C. and consisted essentially of the hydrocarbons. The bulk of the distillate coming over at a vapor temperature between 184° C. and 220° C. (77.8% of the total), constituted a yellow oil having an acid number of 192.5 and an iodine number of 125.5. This consisted essentially of fatty acids, this fraction containing only 0.8% of unsaponifiable material.

Example 12

This example illustrates a treatment at a temperature appreciably below room temperature.

100 g. of refined tall oil were dissolved in 200 g. of a low boiling aliphatic hydrocarbon solvent. While this solution was maintained at about 0° C. (by employment of an ice bath), 20 g. of cyclohexylamine were added slowly with stirring. The rosin cyclohexalide formed and precipitated and was filtered off.

Example 13

50.6 g. of tall oil (rosin acid content—45%) were dissolved in 150 cc. dibutyl ether, while warmed on a water bath. After cooling, 16.9 cc. of cyclohexylamine were added, and the temperature then rose. A precipitate soon appeared and this was filtered, and the filtrate washed several times with dibutyl ether, yielding 25.4 g. of rosin cyclohexylide, when dry, i. e., 80.7% of the rosin acids present in the tall oil taken for treatment.

Example 14

In this example, the same general procedure was followed as in Example 13, but here acetone was employed as solvent instead of dibutyl ether.

48.8 g. of tall oil (45% rosin content) were dissolved in 150 cc. of acetone. 16.65 cc. of cyclohexylamine were added, producing an immediate, strong precipitation. The solution was filtered to recover the precipitate and the latter was washed several times with acetone, finally yielding 29.5 g. of the rosin cyclohexylamine salt (when dried), which represents 86.0% of the theoretical quantity of rosin salts obtainable in this way.

It is claimed:

1. In the separation of rosin acids from tall oil, the method which comprises treating the tall oil in liquid phase with cyclohexylamine, and effecting separation of the resultant rosin acid cyclohexylamine salt at a temperature at which said salt is a solid.

2. In the separation of rosin acids from tall oil, the method which comprises placing the tall oil in solution in an organic solvent in which rosin acids are soluble but in which cyclohexylamine salts of rosin acids are substantially insoluble, treating the solution with cyclohexylamine, and effecting separation of the resultant rosin acid cyclohexylamine salt at a temperature at which said salt is a solid.

3. A method according to claim 2 in which the temperature of separation of the cyclohexylamine salt is in the neighborhood of room temperature.

4. In the separation of rosin acids and fatty acids from tall oil, the method which comprises treating the tall oil in solution in a solvent with cyclohexylamine in quantity sufficient to react with substantially all the rosin acids and fatty acids present, and effecting separation of the resultant rosin-cyclohexylide at a temperature at which said cyclohexylide is a solid, thus leaving a solution containing fatty acid cyclohexylamine salts.

5. The method of separating the resin acids from tall oil which comprises dissolving tall oil in acetone and precipitating the resin acids from the acetone solution with cyclohexylamine at a temperature between about −10° C. and about 50° C.

6. The method of separating the resin acids from tall oil which comprises dissolving tall oil in acetone and precipitating the resin acids from the acetone solution with cyclohexylamine at a temperature between about 10° C. and about 30° C.

7. The method of separating the resin acids from tall oil which comprises dissolving tall oil in an organic solvent selected from the group consisting of acetone, alcohols and aliphatic hydrocarbons, and precipitating the resin acids from the resulting solution at a temperature between about −10° C. and about 50° C. with cyclohexylamine.

8. The method of separating the resin acids from tall oil which comprises dissolving tall oil in an organic solvent selected from the group consisting of acetone, alcohols and aliphatic hydrocarbons, precipitating the resin acids from the resulting solution at a temperature between about −10° C. and about 50° C. with cyclohexylamine, separating the resin acid amine salts so formed from said solution, and decomposing said salts to liberate the free resin acids.

9. The method of separating the resin acids from tall oil which comprises dissolving tall oil in an organic solvent selected from the group consisting of acetone, alcohols and aliphatic hydrocarbons, and precipitating the resin acids from the resulting solution at a temperature between about 10° C. and about 30° C. with cyclohexylamine.

10. The process of refining disproportionated rosin by separating the rosin acids from the neutral bodies which comprises dissolving disproportionated rosin in acetone and adding cyclohexylamine to the acetone solution, the rosin acids precipitating as their cyclohexylamine salts.

11. The process of refining disproportionated rosin by separating the rosin acids from the neutral bodies which comprises dissolving disproportionated rosin in gasoline and adding cyclohexylamine to the gasoline solution, the rosin acids precipitating as their cyclohexylamine salts.

12. The process of refining disproportionated rosin by separating the rosin acids from the neutral bodies which comprises dissolving disproportionated rosin in acetone and adding cyclohexylamine to the acetone solution, the amount of cyclohexylamine added being at least sufficient to react with substantially all of the rosin acids present, the rosin acids precipitating as their cyclohexylamine salts.

13. The process of refining disproportionated rosin by separating the rosin acids from the neutral bodies, which comprises dissolving disproportionated rosin in gasoline and adding cyclohexylamine to the gasoline solution, the amount of cyclohexylamine added being at least sufficient to react with substantially all of the rosin acids present, the rosin acids precipitating as their cyclohexylamine salts.

14. The process of refining disproportionated rosin by separating the rosin acids from the neutral bodies which comprises dissolving disproportionated rosin in acetone and precipitating the rosin acids from the acetone solution with cyclohexylamine, at a temperature between about 30° C. and about 60° C.

15. The process of refining disproportionated rosin by separating the rosin acids from the neutral bodies which comprises dissolving disproportionated rosin in acetone, precipitating the rosin acids from the acetone solution with cyclohexylamine at a temperature between about 30° C. and about 60° C., cooling the resulting suspension of amine salts to a temperature between about −10° C. and about 20° C., filtering the amine salts from the acetone solution and decomposing said salts to liberate the free rosin acids.

16. The process of refining rosin by separating the rosin acids from the neutral bodies which comprises dissolving rosin in acetone and adding cyclohexylamine to the acetone solution, the rosin acids precipitating as their cyclohexylamine salts.

17. The process of refining rosin by separating the rosin acids from the neutral bodies which comprises dissolving rosin in gasoline and adding cyclohexylamine to the gasoline solution, the rosin acids precipitating as their cyclohexylamine salts.

18. The process of refining rosin by separating the rosin acids from the neutral bodies which comprises dissolving rosin in an organic solvent selected from the group consisting of acetone and gasoline and adding cyclohexylamine to the resulting solution, the rosin acids precipitating as their cyclohexylamine salts.

19. The process of refining rosin by separating the rosin acids from the neutral bodies which comprises dissolving rosin in acetone and adding cyclohexylamine to the acetone solution, the amount of cyclohexylamine added being at least sufficient to react with substantially all of the rosin acids present, the rosin acids precipitating as their cyclohexylamine salts.

20. The process of refining rosin by separating the rosin acids from the neutral bodies which comprises dissolving rosin in gasoline and adding cyclohexylamine to the gasoline solution, the amount of cyclohexylamine added being at least sufficient to react with substantially all of the rosin acids present, the rosin acids precipitating as their cyclohexylamine salts.

21. The process of refining rosin by separating the rosin acids from the neutral bodies which comprises dissolving rosin in an organic solvent selected from the group consisting of acetone and gasoline and adding cyclohexylamine to the resulting solution, the amount of cyclohexylamine added being at least sufficient to react with substantially all of the rosin acids present, the rosin acids precipitating as their cyclohexylamine salts.

22. The process of refining rosin by separating the rosin acids from the neutral bodies which comprises dissolving rosin in acetone and adding cyclohexylamine to the acetone solution at a temperature between about 30° C. and about 60° C., the rosin acids precipitating as their cyclohexylamine salts.

23. The method of separating rosin acids from mixed materials containing rosin acids, which comprises placing such materials in solution in an organic solvent in which the rosin acids and materials mixed therewith are soluble but in which cyclohexylamine salts of the rosin acids are substantially insoluble, treating the solution with cyclohexylamine, and effecting separation of the resultant rosin acid cyclohexylamine salt at a temperature at which said salt is a solid.

24. The method according to claim 23 where the material being treated is rosin.

25. The method according to claim 23 where the material being treated is disproportionated rosin.

26. The method according to claim 23 where the material being treated is oleoresin.

ANNA KALMAN,

*Executrix of the Estate of Nicholas L. Kalman, Deceased.*

No references cited.